US009986872B2

United States Patent
Shalvi et al.

(10) Patent No.: US 9,986,872 B2
(45) Date of Patent: Jun. 5, 2018

(54) MIXING CONTAINER

(71) Applicants: Nimrod Jonathan Shalvi, Closter, NJ (US); Ron Starinsky, Ramat Gan (IL); Ziv Hayat, Moshav Nir Yafe (IL)

(72) Inventors: Nimrod Jonathan Shalvi, Closter, NJ (US); Ron Starinsky, Ramat Gan (IL); Ziv Hayat, Moshav Nir Yafe (IL)

( * ) Notice: Subject to any disclaimer, the term of this patent is extended or adjusted under 35 U.S.C. 154(b) by 294 days.

(21) Appl. No.: 15/099,176

(22) Filed: Apr. 14, 2016

(65) Prior Publication Data

US 2017/0296000 A1    Oct. 19, 2017

(51) Int. Cl.
*A47J 43/27* (2006.01)
*B01F 15/02* (2006.01)

(52) U.S. Cl.
CPC .......... *A47J 43/27* (2013.01); *B01F 15/0216* (2013.01); *B01F 15/0222* (2013.01); *B01F 15/0261* (2013.01)

(58) Field of Classification Search
CPC ..................................... A47J 43/27
USPC ....... 215/6; 366/129, 130, 160.1; 222/142.1, 222/142.6, 145.7
See application file for complete search history.

(56) References Cited

U.S. PATENT DOCUMENTS

| | | |
|---|---|---|
| 825,680 A | 7/1906 | Raymond |
| 3,727,800 A | 4/1973 | Santos |
| 5,143,261 A | 9/1992 | Drobish |
| 5,713,491 A | 2/1998 | Hughes |
| 6,540,112 B1 | 4/2003 | Studnik |
| 7,299,936 B2 | 11/2007 | Singh |
| 7,934,624 B2 | 5/2011 | Seelhofer |
| 8,104,642 B2 | 1/2012 | Bambreck |
| 8,875,874 B2 | 11/2014 | Helov |
| 2006/0249472 A1 | 11/2006 | Kullson |

*Primary Examiner* — David Sorkin
(74) *Attorney, Agent, or Firm* — Offit Kurman, P.A.; Robert D. Katz, Esq.

(57) ABSTRACT

The invention provides a mixing container comprising: a liquid holding vessel having first and second chambers each for holding a different liquid; a mixing unit having a first valve and a second adjustable valve, the second adjustable valve having an opening that can be partially closed to permit a pre-determined portion of liquid from each chamber to be dispensed when pouring from the mixing container; and the second valve including a series of teeth around the periphery thereof for engaging an adjustment wheel in the mixing unit to open or close the opening in the second adjustable valve.

9 Claims, 3 Drawing Sheets

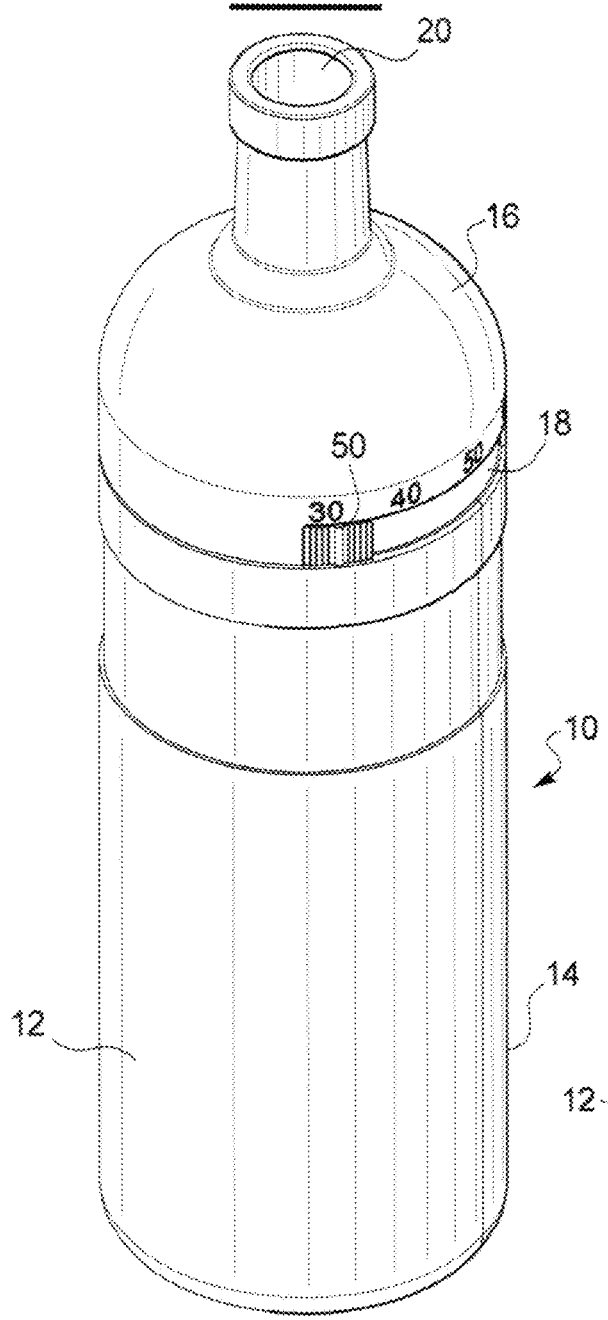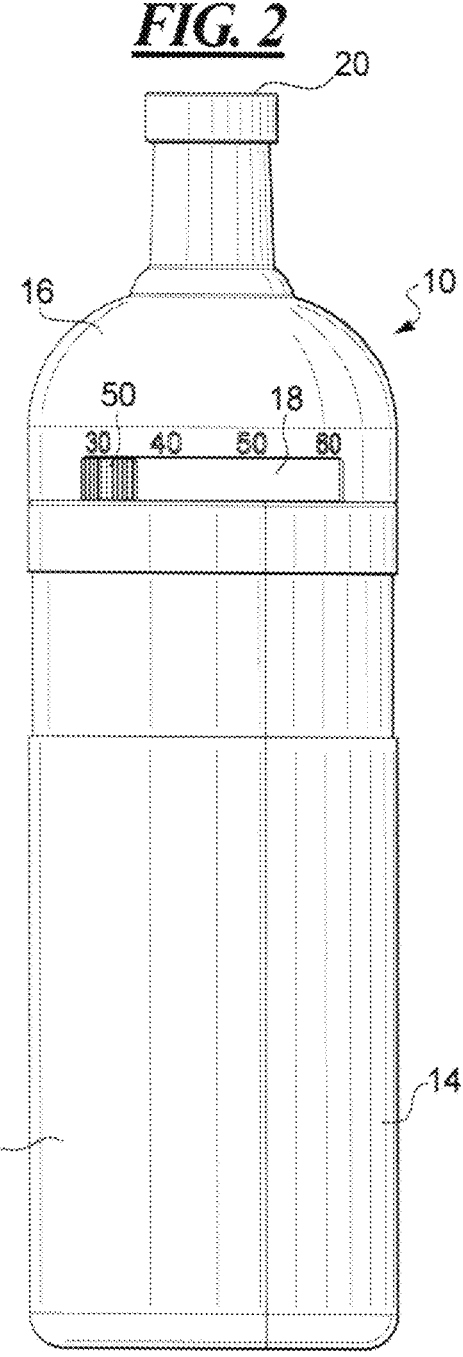

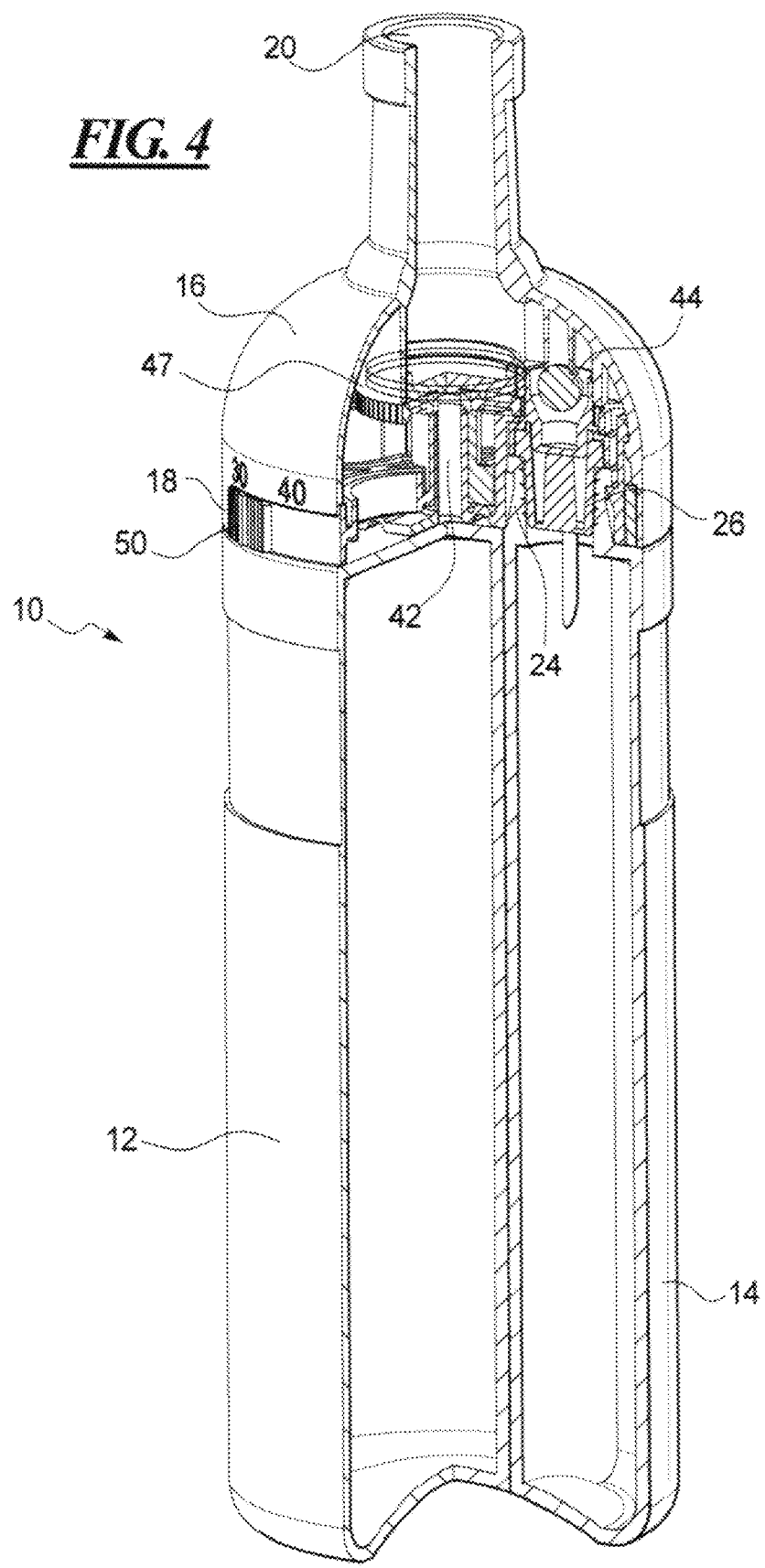

MIXING CONTAINER

FIELD OF THE INVENTION

This invention relates to drink containers and more particularly to drink containers having two chambers, each capable of holding a different liquid, and having an adjustable mixing mechanism to vary the proportions of the liquids dispensed by the container.

BACKGROUND OF THE INVENTION

Various multiple chamber drink containers have been created over the years. U.S. Pat. No. 825,680 (Raymond) provides a multiple chamber container but appears to have no mixing capability. U.S. Pat. No. 3,727,800 (Santos) illustrates a two chamber container with spouts of varying diameters that can pour liquor and a mixer at the same time. U.S. Pat. No. 5,143,261 (Drobish) appears to provide a multi-compartment container for dispensing uniform volumes of liquid ingredients simultaneously in desired proportion to form a mixture. U.S. Pat. No. 5,713,491 (Hughes) discusses a pouring device for pouring dark and white liqueurs from adjacent containers in a bottle.

U.S. Pat. No. 6,540,112 (Studnik) discloses another drink mix cap dispensing apparatus that separately stores concentrated mixes in one or more compartments. Rotating the head assembly of the dispenser selects the concentrated mix for dispensing. U.S. Pat. No. 7,299,936 (Singh) provides a beverage bottle having an outer bottle and an inner container, each holding a different liquid. The inner container, which holds liquor, for example, is twisted to slow dispensing of the liquor as compared to the mixer in the outer chamber.

U.S. Pat. No. 7,934,624 (Seelhofer) also provides a container closure to pour out two separate liquids in a specific quantitative ratio from inner and outer chambers in a container, while U.S. Pat. No. 8,104,642 (Bambreck) diseases a beverage container having two or three chambers, an outer housing, a discharge nozzle, and a mixing nozzle.

U.S. Pat. No. 8,662,351 (Kalouze) provides a supplemental liquid storage device for attachment and use with a conventional beverage can. The device includes a mixing aperture to combine the liquids in the can and in the supplemental container.

Another device disclosed in U.S. Pat. No. 8,875,874 (Helov) discloses a mixing container including an outer vessel, one or more inner vessels and a lid. The lid closes or opens one or more of the inner vessels and the bottom of the outer vessel. U.S. Patent Application No. 2006/0249472 uses a standard 64-ounce bottle and divides it into two sections. A plastic mix dial with a rounded triangular cut allows the liquid to pass through the neck of the bottle.

Despite numerous attempts of others, there exists a need for a compartmental container that has an adjustable mixing mechanism that can vary the mixing of the liquids therein when poured from the container. It is therefore an object of the invention to provide a mixing container having valves that can be adjusted to increase or decrease the amount of liquid dispensed from at least one of the chambers.

SUMMARY OF THE INVENTION

In one embodiment, the invention provides a mixing container comprising: a liquid holding vessel having first and second chambers each for holding a different liquid; a mixing unit having a first valve and a second adjustable valve, the second adjustable valve having an opening that can be partially closed to permit a pre-determined portion of liquid from each chamber to be dispensed when pouring from the mixing container; and the second adjustable valve including a series of teeth around the periphery thereof for engaging an adjustment wheel in the mixing unit to open or close the opening in the second adjustable valve.

Another embodiment, the first chamber is larger than the second chamber. In another embodiment, the second chamber is larger than the first chamber.

The mixing container may be used to prepare a large variety of alcoholic or non-alcoholic beverages, or can also be used to hold a concentrate or syrup on one chamber and water or carbonated water in the other chamber. Alternatively, for example, the mixing container can be used to dispense oil and vinegar for salad dressing, or a mixture of medications.

BRIEF DESCRIPTION OF THE DRAWINGS

Further features, objects, and advantages of the invention will be apparent from review of the following detailed description of the preferred embodiments taken in connection with the attached drawings in which:

FIG. 1 is a perspective view of the mixing container of the present invention.

FIG. 2 is a front elevation of the mixing container of FIG. 1;

FIG. 4 is a front view of the mixing container of FIG. 1, partially in section.

DETAILED DESCRIPTION OF THE PREFERRED EMBODIMENTS

Figure 3:
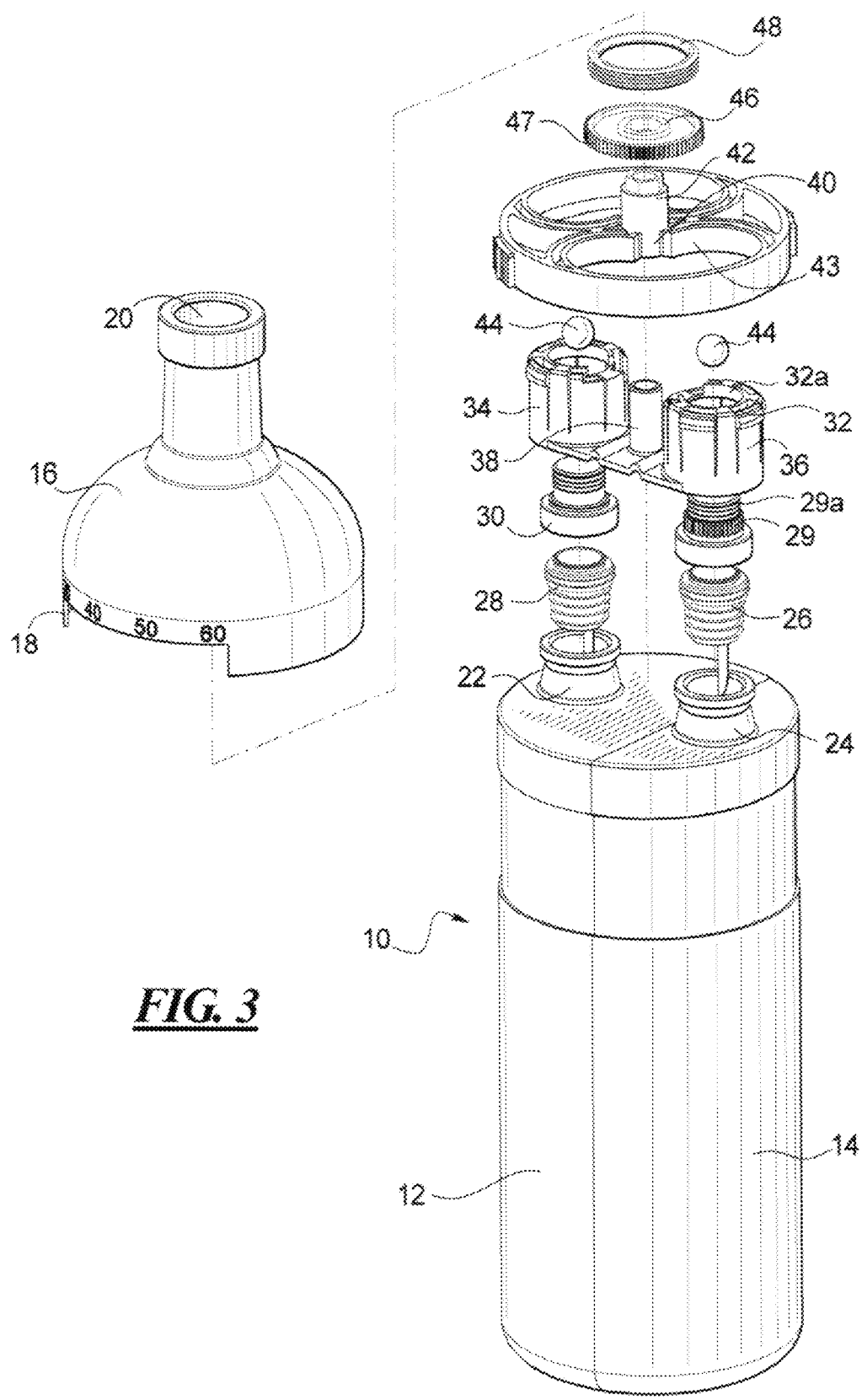
FIG. 3 is an exploded view of the mixing container of FIG. 1.

Turning to the drawings, FIG. 1 is a perspective view of the mixing container of the present invention, generally designated by the reference numeral 10. As shown in FIGS. 1 through 3, the mixing container 10 includes two chambers 12, 14 to hold two separate liquids, a cap 16, a mixing adjuster 18, and a pouring spout 20.

The two chambers 12, 14 generally form two half cylinders, as shown in FIG. 1, although other shapes including a hollow rectangular, hexagonal, or octagonal forms can be used. The cap 16 extends from above the mixing adjuster 18, and preferably has sloping shoulders culminating in the central pouring spout 20, which includes an opening that can be capped (not shown) to avoid entry of dirt and bacteria into the container 10.

The mixing adjuster 18 includes a sliding wheel 40, which controls the ratio of liquid that can escape from the second chamber 14 when pouring liquid from the container 10. The parts and construction of the mixing adjuster 18 mechanism can be understood with reference to FIG. 3, which shows the various parts thereof in exploded view. Each chamber 12, 14 includes an opening 22, 24 to allow ingress and egress of fluid contained in the chambers 12, 14. A nozzle 26, 27 fits into each opening 22, 24 to direct egress flow from the opening 22, 24. A rotary valve 28, 30 sits on top of each nozzle 26. On the rotary valves 28, 30 fits a base 32, including covers 34, 36 for the nozzles 26 and valves 28, 30, and a receptacle 38 for the adjustment wheel 40 and central hub 42, which attach to the adjustment wheel 40 with spokes 43. Stainless steel balls 44 close off the openings in the nozzle covers 34, 36 to prevent entry of debris or backflow into the containers 12, 14. A gear 46 having a central aperture sits on the adjustment wheel 40. The central hub 42 on the adjustment wheel 40 has a hex nut 42 on top, which mates with a hex shaped central aperture in adjustment gear 46. The adjustment gear 46 has teeth 47 around its periphery that mate with teeth 29 located on one of the rotary corks 28 through an opening on that side of the base 32 that exposes the teeth 29 on the rotary cork 28 to allow it to mate with the teeth 47 on the periphery of the adjustment wheel 40. Above that sits a central cork 48. The cap 16 preferably has numerals etched or printed thereon which may represent the ratio or proportion of one liquid to another based on a pointer 50 located on the adjustment wheel 18.

The rotary cork 28 that fits on the side of the smaller container 14, which usually holds the liquor, has a partially closed aperture 29*a*, as does the top 32*a* of the base 32 into which that rotary cork 28 fits. The partially closed top 32*a* of the base 32 is fixed in place, while the partially closed aperture 29*a* rotates to create a larger or smaller aperture, as desired by the user. As understood by a person of ordinary skill, the rotation of the aperture permits more or less of the liquid in that side of the container 14 to pour liquid.

The mixing container of the present invention may be made from a variety of materials, but preferably is made from a rigid, non-toxic, food grade plastic, such as PVC, HDPE, polypropylene, polyethylene-terephthalate, polycarbonate, and the like. Some parts may be made from different plastics, or from metal, depending on the intended use. In some applications, the container and cap may be metal to enhance disability.

It should be apparent to those of ordinary skill in the art having reviewed the present disclosure that the present invention provides a number of advantages, including the ability to alter cocktail or drink strength merely be turning the adjustment wheel, and the ability to use the mixing container to create a variety of drinks, both alcoholic and non-alcoholic, by making use of the smaller chamber for drink mix concentrate or syrup, and the larger container using water to dilute or mix the concentrate. The mixing container can also conveniently be used to hold additional oil and vinegar for salad dressing. The mixing container can also have the reverse configuration in other embodiments, so that the adjustable valve is located on the larger chamber.

In operation in one preferred embodiment the container is filled with two liquids, for example, a liquor such as vodka, gin, rum, or whiskey in the smaller adjustable chamber, and a mixer such as tonic, club soda, orange juice, or cola. In the usual case, a cocktail will have one to three ounces liquor to six to ten ounces of mixer, but the proportions may be varied according to taste and preference of the user. The mixing container must be able to dispense both liquor and mixer or syrup and water (plain or carbonated) in proper quantities so that the cocktail or drink has the proper proportions. To accomplish this, the adjusting wheel is moved to open or close the aperture on the smaller container side to dispense the desired ratio of liquids. The wheel opens the orifice in each chamber sufficiently, to allow the required quantity.

It is to be understood that the detailed description and the preferred embodiments illustrate the practice of the invention, but numerous modifications will occur to those of ordinary skill in the art. It is intended that all such modifications be covered within the scope of invention as defined by the following claims.

What is claimed is:

1. A mixing container comprising:
  a liquid holding vessel having first and second chambers each for holding a different liquid;
  a mixing unit having a first valve and a second adjustable valve, the second adjustable valve having an opening that can be partially closed to permit a predetermined portion of liquid from each chamber to be dispensed when pouring from the mixing container; and
  the second valve including a series of teeth around the periphery thereof for engaging an adjustment wheel in the mixing unit to open or close the opening in the second adjustable valve.

2. A mixing container according to claim 1, wherein the first chamber is larger than the second chamber.

3. A mixing container according to claim 1, wherein the first chamber holds a non-alcoholic beverage and the second chamber holds an alcoholic beverage.

4. A mixing container according to claim 2, wherein the first chamber holds oil and the second chamber holds vinegar.

5. A mixing chamber according to claim 2, wherein the second chamber holds a flavor concentrate for tea, coffee, chocolate, cola, or a fruit flavor, and the first chamber holds water or carbonated water.

6. A mixing container according to claim 1, wherein the first and second chambers include openings for fluid ingress and egress at an upper end thereof, the opening sized to seat first and second nozzles that direct fluid flow into and from the openings.

7. A mixing container according to claim 6, wherein the first sad second adjustable valves are seated on the first and second nozzles.

8. A mixing container according to claim 7, wherein the first and second adjustable valves fit into a base of the mixing unit.

9. A mixing container as set forth in claim 8, wherein the base includes a spindle to receive the adjustment wheel.

\* \* \* \* \*